US010570920B2

(12) United States Patent
Lee

(10) Patent No.: US 10,570,920 B2
(45) Date of Patent: Feb. 25, 2020

(54) CLIP FAN

(71) Applicant: NOVEL INNOVATIONS INC., Seoul (KR)

(72) Inventor: Jun Hyung Lee, Seoul (KR)

(73) Assignee: NOVEL INNOVATIONS INC., Seoul (KR)

( * ) Notice: Subject to any disclaimer, the term of this patent is extended or adjusted under 35 U.S.C. 154(b) by 313 days.

(21) Appl. No.: 15/327,037

(22) PCT Filed: Mar. 9, 2016

(86) PCT No.: PCT/KR2016/002311
§ 371 (c)(1),
(2) Date: Jan. 18, 2017

(87) PCT Pub. No.: WO2017/155133
PCT Pub. Date: Sep. 14, 2017

(65) Prior Publication Data
US 2018/0209432 A1   Jul. 26, 2018

(51) Int. Cl.
F04D 29/42 (2006.01)
F04D 29/44 (2006.01)
F04D 25/08 (2006.01)
F04D 25/06 (2006.01)
F04D 29/46 (2006.01)

(52) U.S. Cl.
CPC ..... *F04D 29/4246* (2013.01); *F04D 25/0673* (2013.01); *F04D 25/08* (2013.01); *F04D 25/084* (2013.01); *F04D 29/442* (2013.01); *F04D 29/462* (2013.01)

(58) Field of Classification Search
CPC .... F04D 25/08; F04D 25/084; F04D 29/4246; F04D 29/442; F04D 29/462
USPC ............................................. 417/234; 416/63
See application file for complete search history.

(56) References Cited

U.S. PATENT DOCUMENTS 5,146,765 A * 9/1992 Waters ...................... A61F 7/02
454/370
5,667,732 A * 9/1997 Lederer ............... B01F 3/04035
239/222.11

(Continued)

FOREIGN PATENT DOCUMENTS

CN     2051298 U     1/1990
CN     2354047 Y     12/1995

(Continued)

OTHER PUBLICATIONS

Machine Translation of KR 2013 0078747.*

(Continued)

*Primary Examiner* — Christopher S Bobish
(74) *Attorney, Agent, or Firm* — Revolution IP, PLLC

(57) ABSTRACT

Provided is a clip fan including: a housing which has an air inlet provided to allow outside air to be introduced into the housing, and an air outlet provided to allow the air introduced through the air inlet to be discharged to the outside; a fan unit which includes a motor and a fan, is embedded in the housing, draws outside air through the air inlet, and discharges the air to the outside through the air outlet; and a clip which is coupled to an outer surface of the housing, and configured to be opened or closed by elastic force.

10 Claims, 23 Drawing Sheets

(56) References Cited

U.S. PATENT DOCUMENTS

| | | | | |
|---|---|---|---|---|
| 6,073,305 | A * | 6/2000 | Hesskamp | A47L 5/14 15/405 |
| 6,666,647 | B1 * | 12/2003 | Trask | F04D 25/08 224/258 |
| 7,204,463 | B2 * | 4/2007 | Cheng | F04D 25/084 16/400 |
| 7,828,524 | B2 * | 11/2010 | Chen | F04D 25/084 415/206 |
| 7,997,565 | B1 * | 8/2011 | Chan | F24F 6/043 261/107 |
| 8,608,437 | B1 * | 12/2013 | Cantin, Jr. | F04B 35/06 415/206 |
| 8,696,300 | B1 * | 4/2014 | Burke, Jr. | F04D 19/002 415/1 |
| 2013/0121816 | A1 * | 5/2013 | Tang | F04D 25/14 415/203 |
| 2014/0090410 | A1 * | 4/2014 | Decker | F04D 25/0673 62/259.3 |
| 2014/0093404 | A1 * | 4/2014 | Long | F04D 25/084 417/234 |
| 2018/0180345 | A1 * | 6/2018 | Zhu | F25D 17/04 |

FOREIGN PATENT DOCUMENTS

| | | |
|---|---|---|
| CN | 201687747 U | 12/2010 |
| CN | 203476742 U | 3/2014 |
| CN | 104314880 A | 1/2015 |
| JP | 2012-007597 A | 1/2012 |
| JP | 2013-253590 A | 12/2013 |
| JP | 2014-058915 A | 4/2014 |
| JP | 2015-034693 A | 2/2015 |
| KR | 10-2013-0119574 A | 11/2013 |
| KR | 10-1446609 B1 | 10/2014 |
| KR | 10-2015-0005210 A | 1/2015 |

OTHER PUBLICATIONS

Machine Translation of JP 2012-7597.*
International Search Report for PCT/KR2016/002311 dated Jun. 13, 2016 from Korean Intellectual Property Office.

* cited by examiner

[FIG. 1]
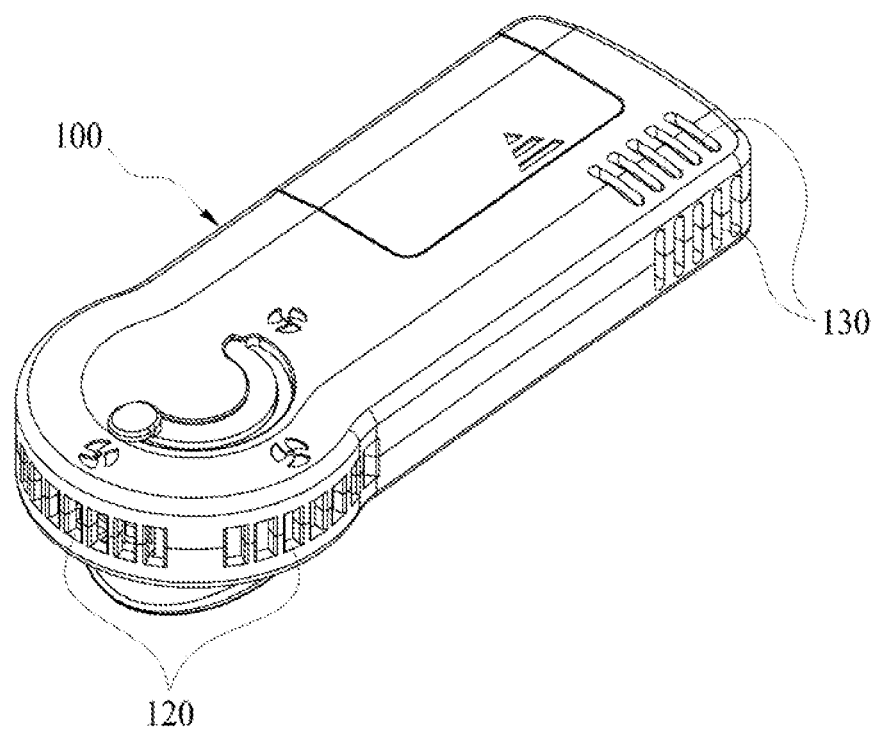

[FIG. 2]
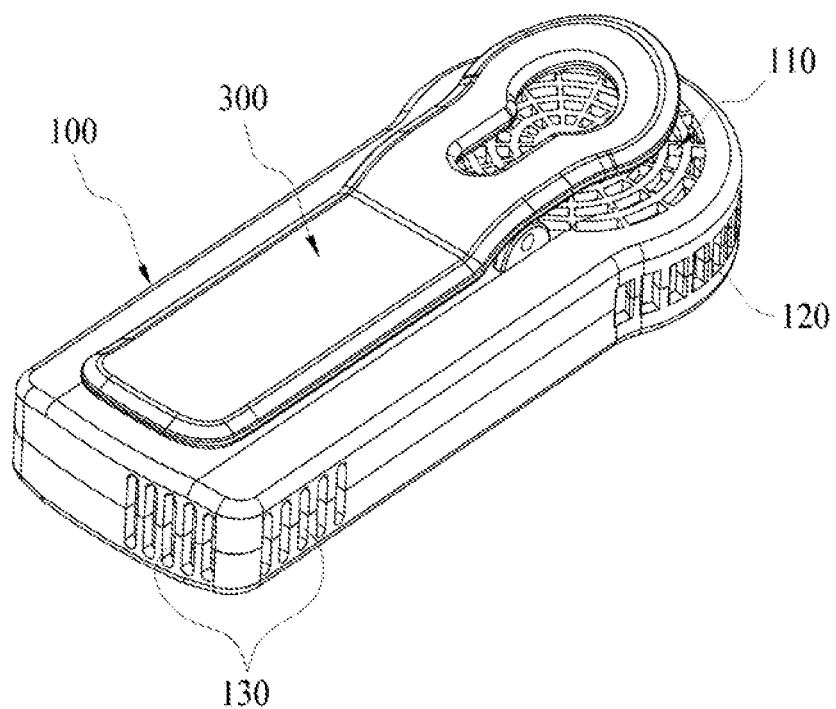

[FIG. 3]
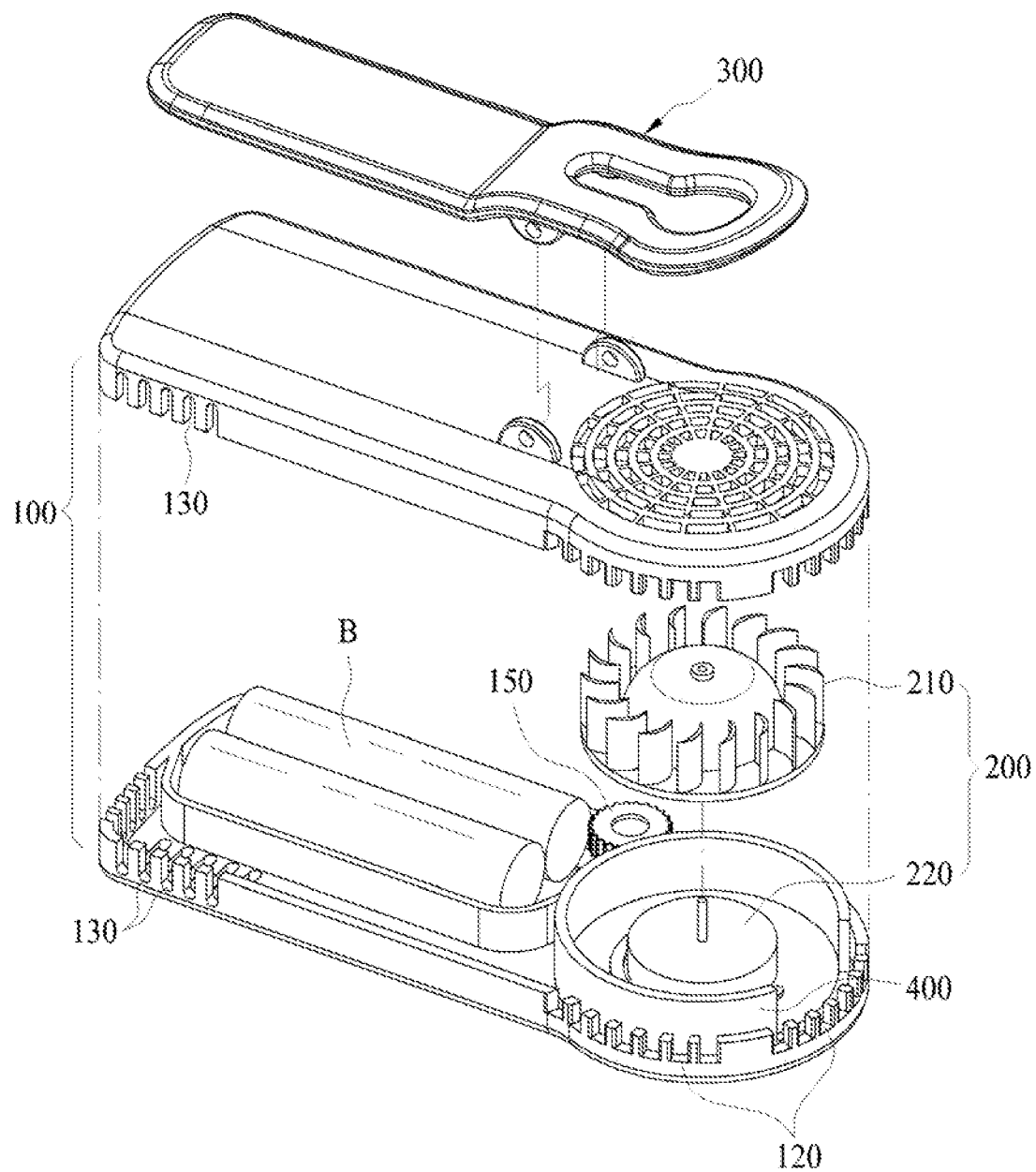

[FIG. 4]
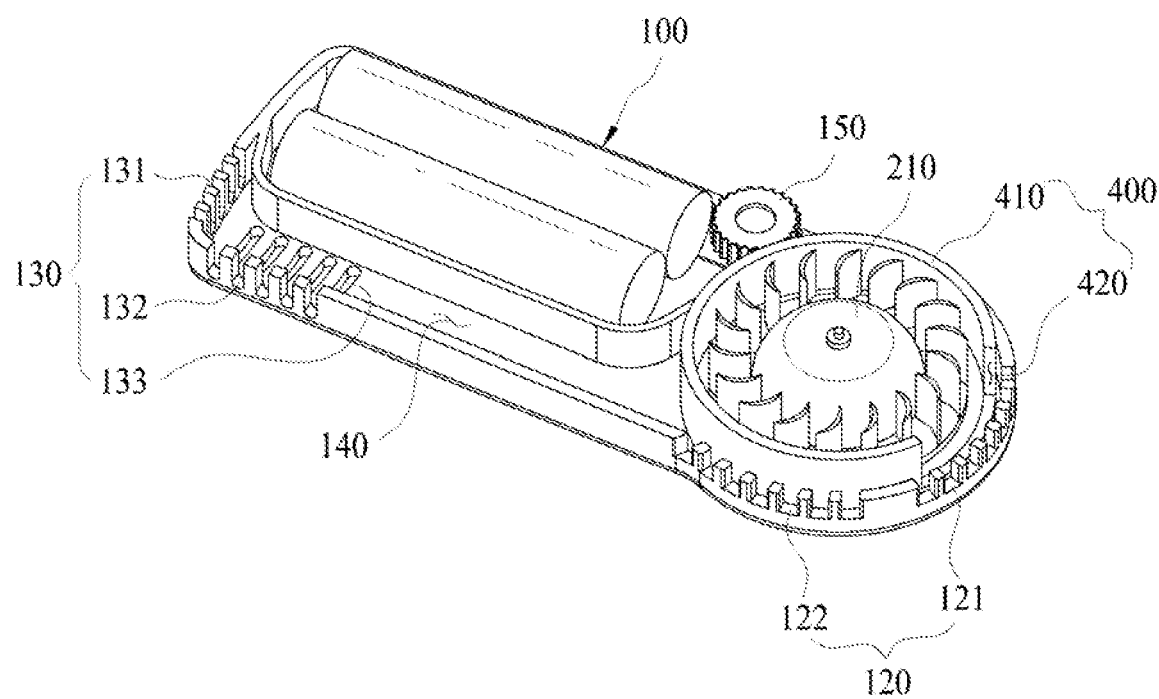

[FIG. 5]
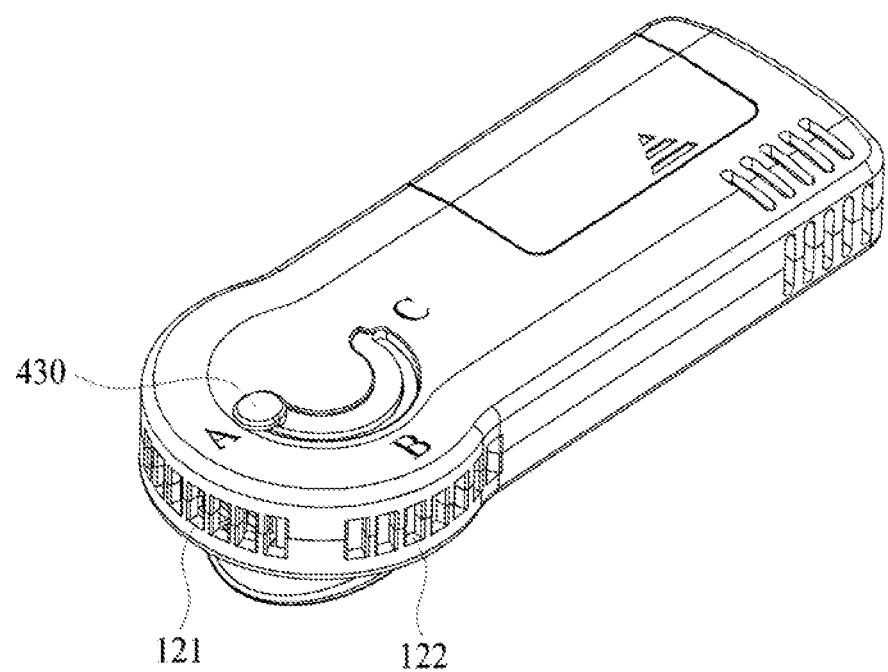

[FIG. 6]
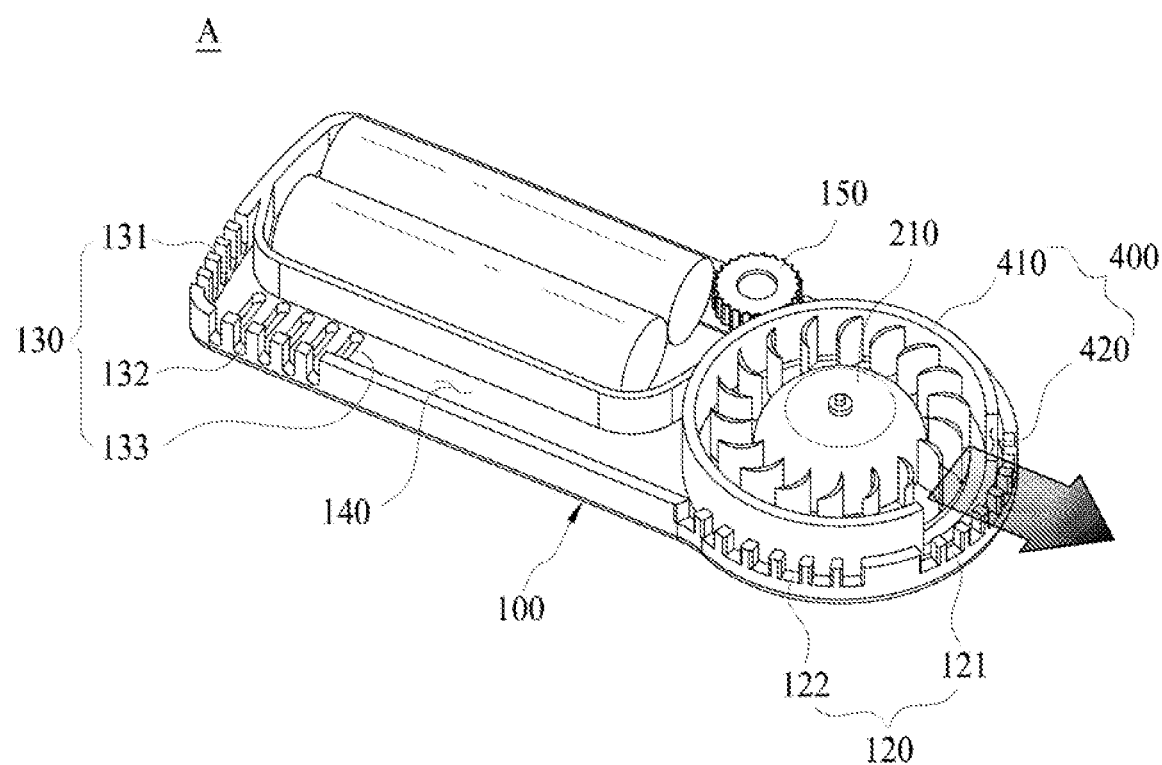

[FIG. 7]
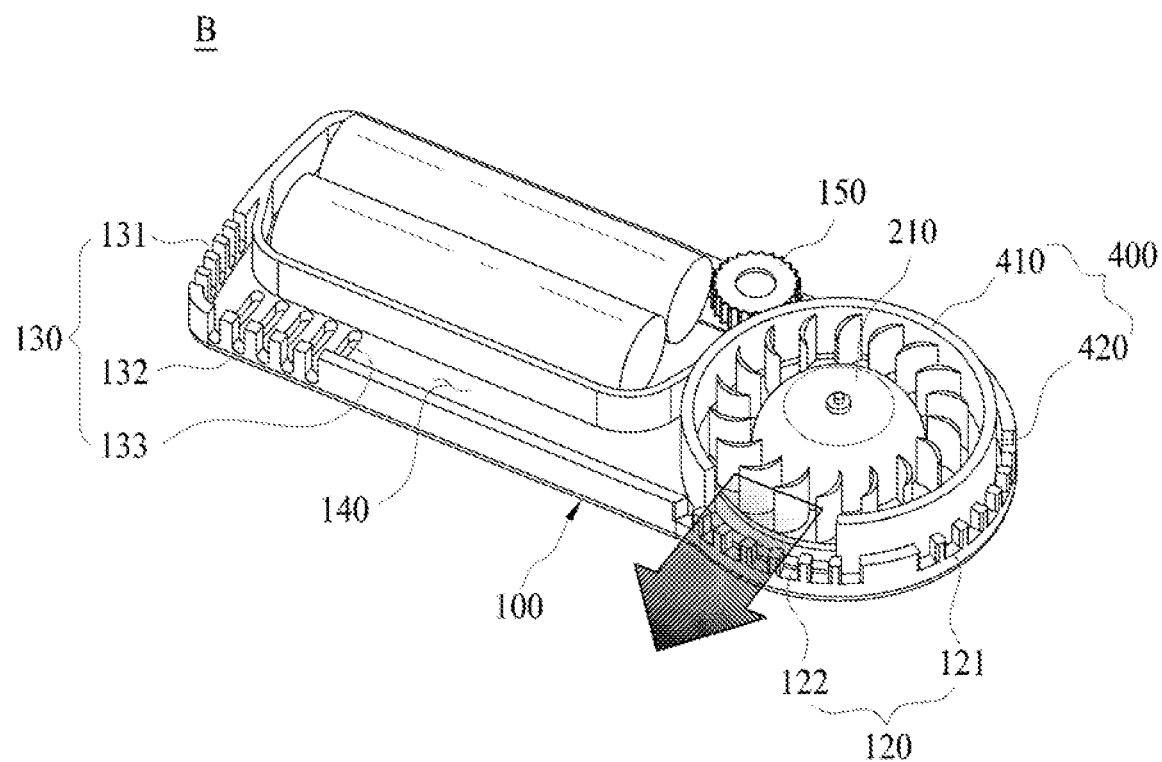

[FIG. 8]
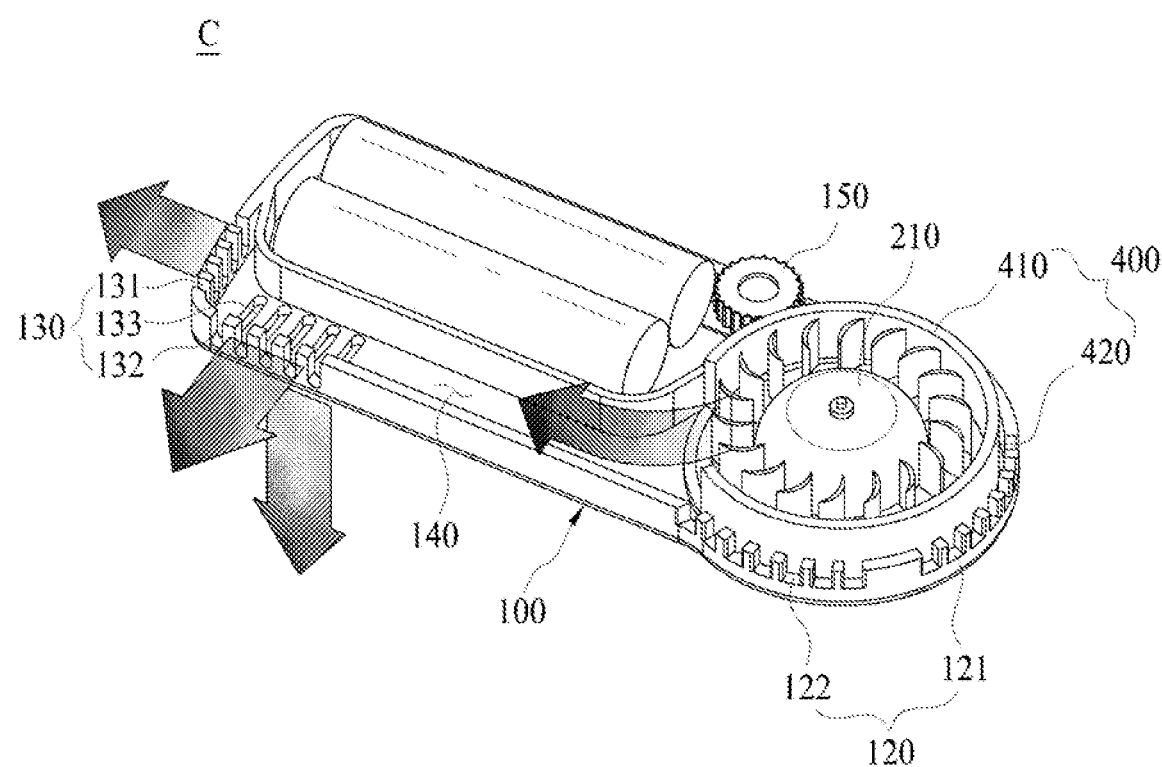

[FIG. 9]
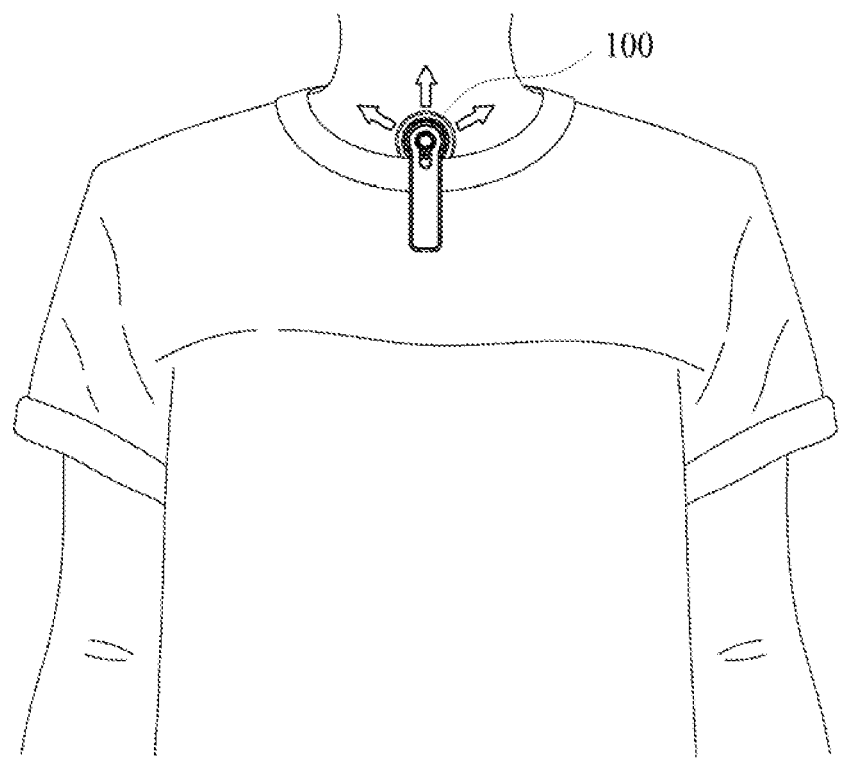

[FIG. 10]
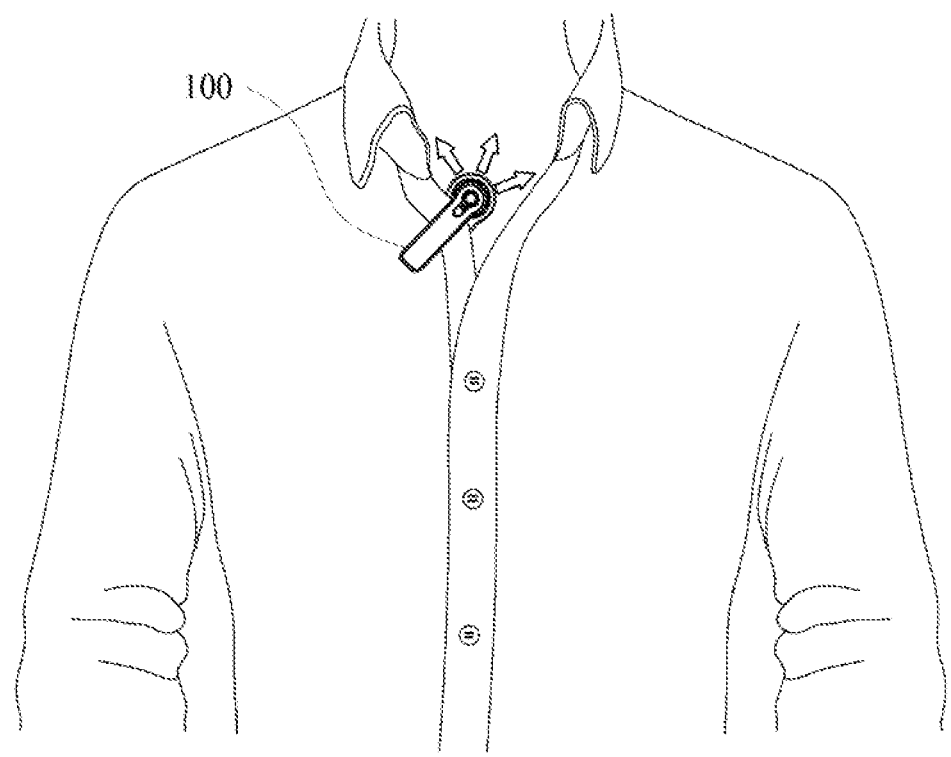

[FIG. 11]
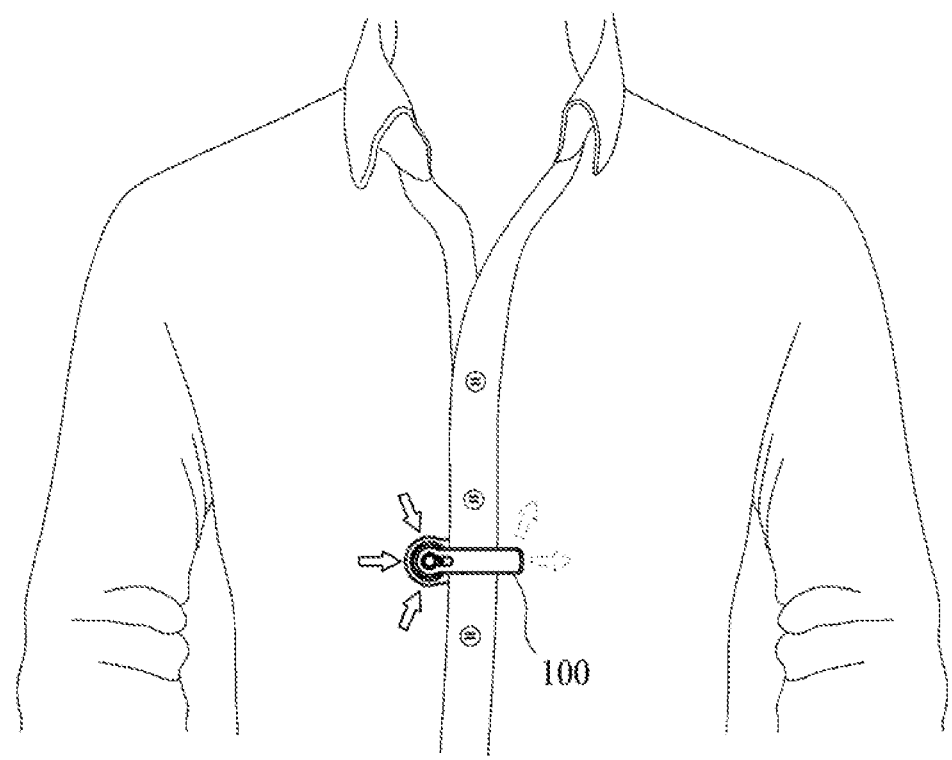

[FIG. 12]
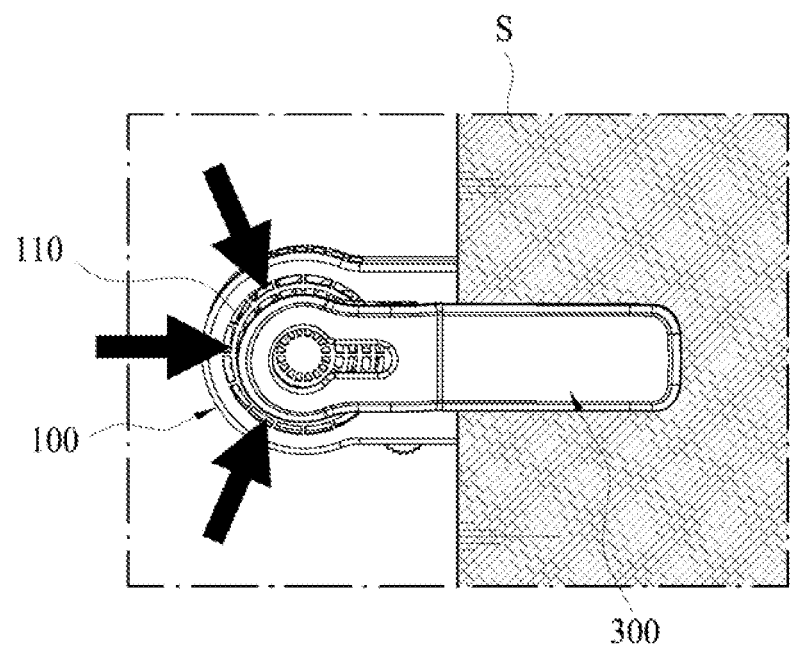

[FIG. 13]
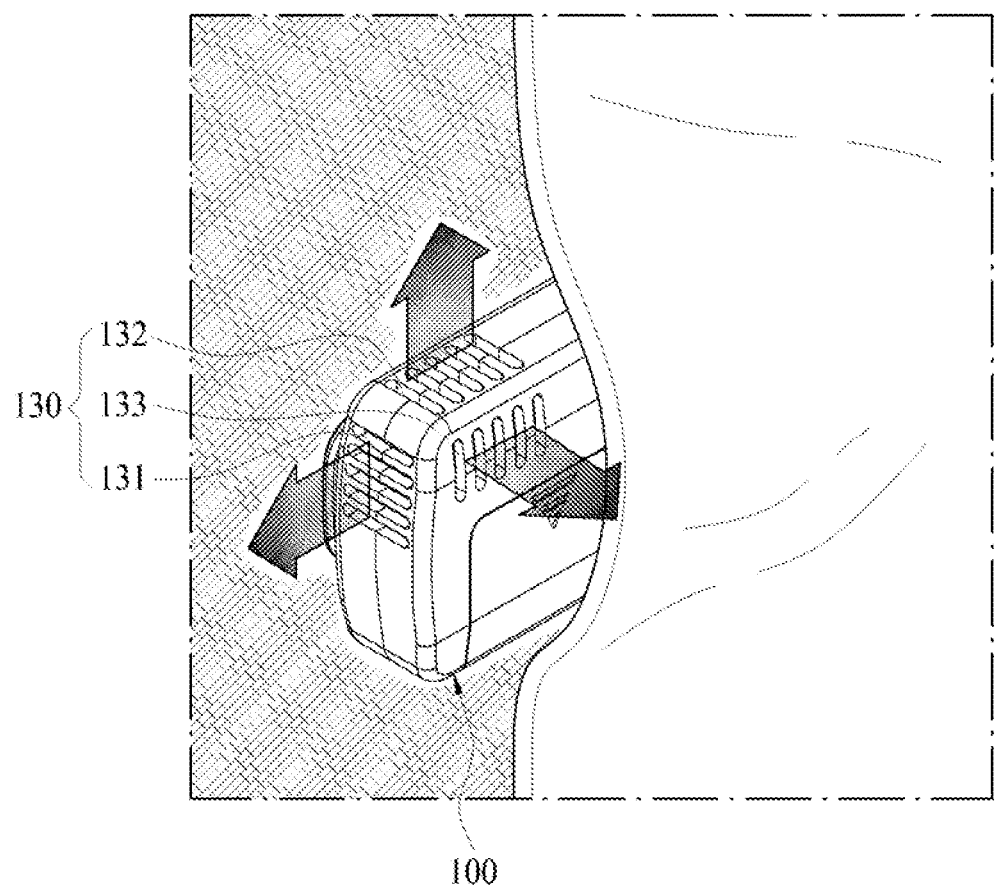

[FIG. 14]
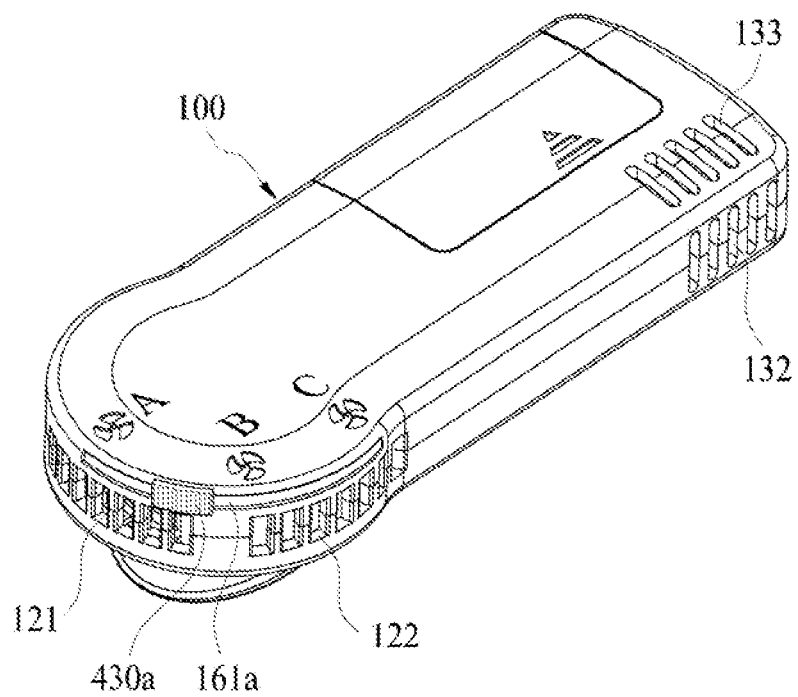

[FIG. 15]
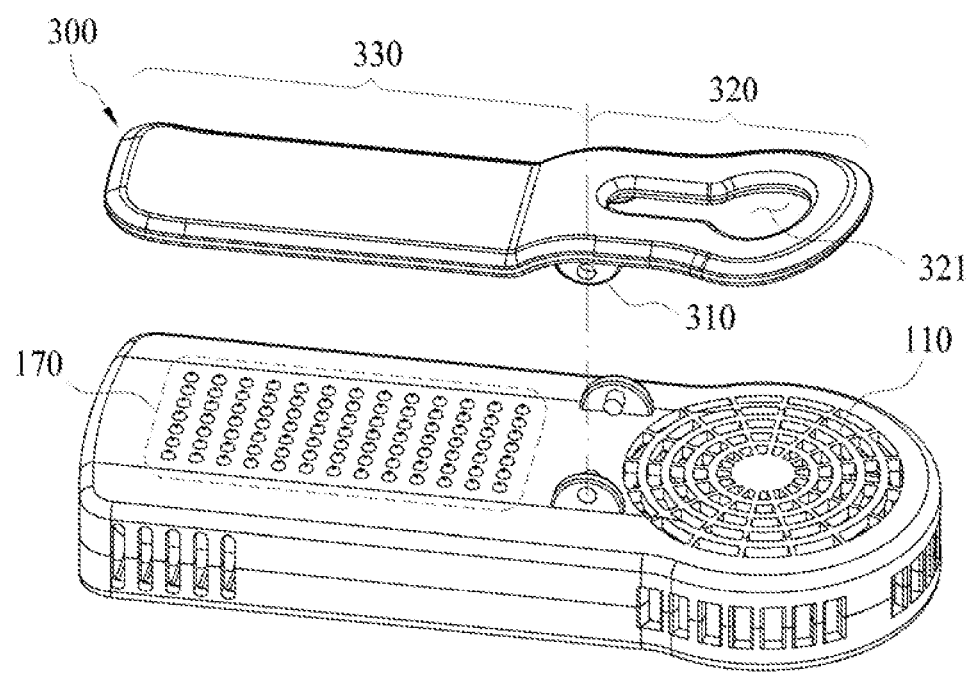

[FIG. 16]
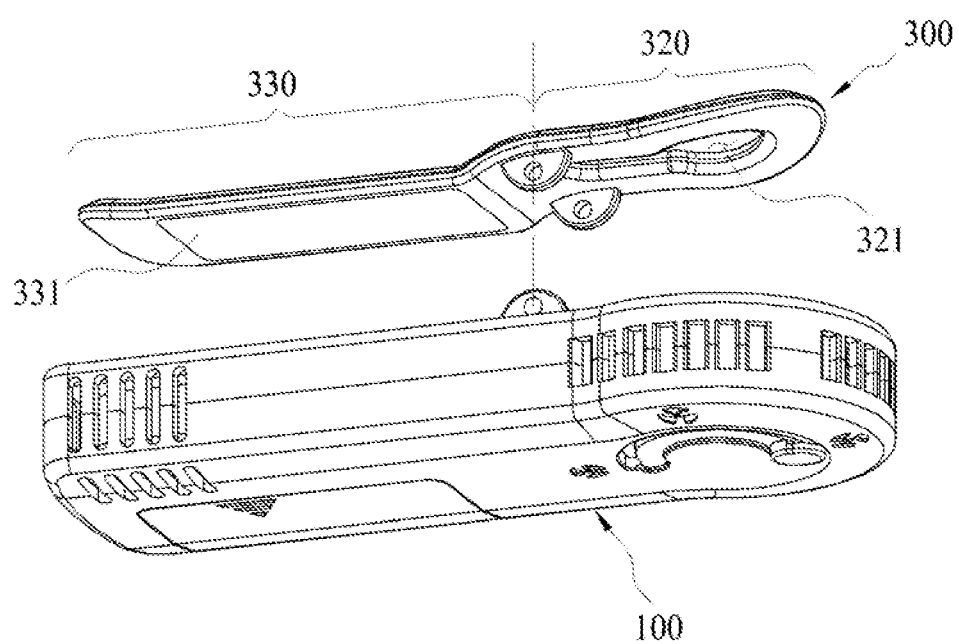

[FIG. 17]
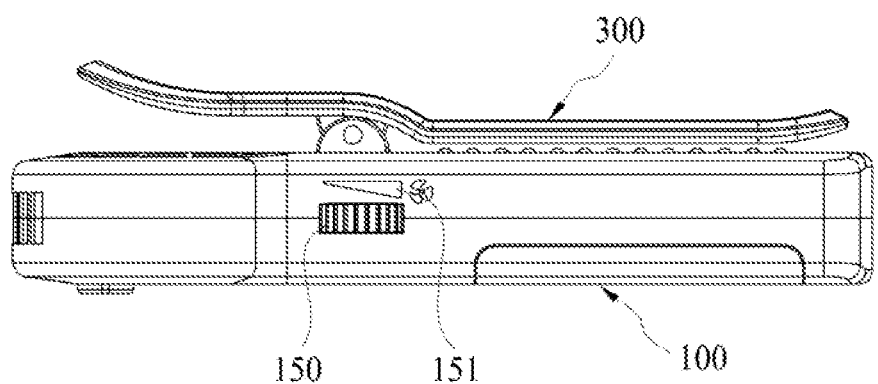

[FIG. 18]
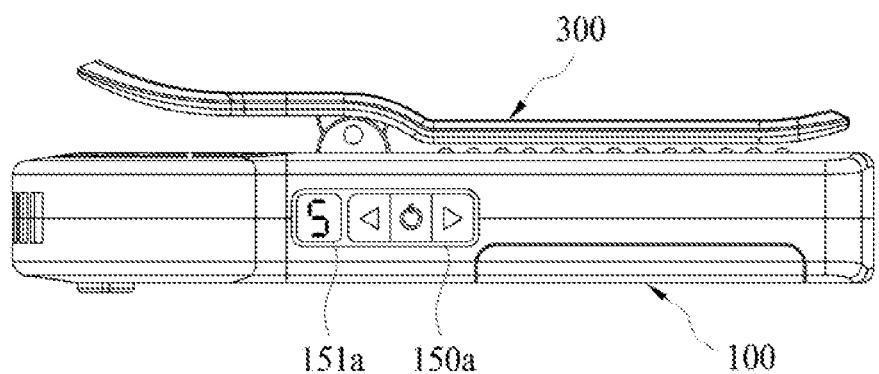

[FIG. 19]
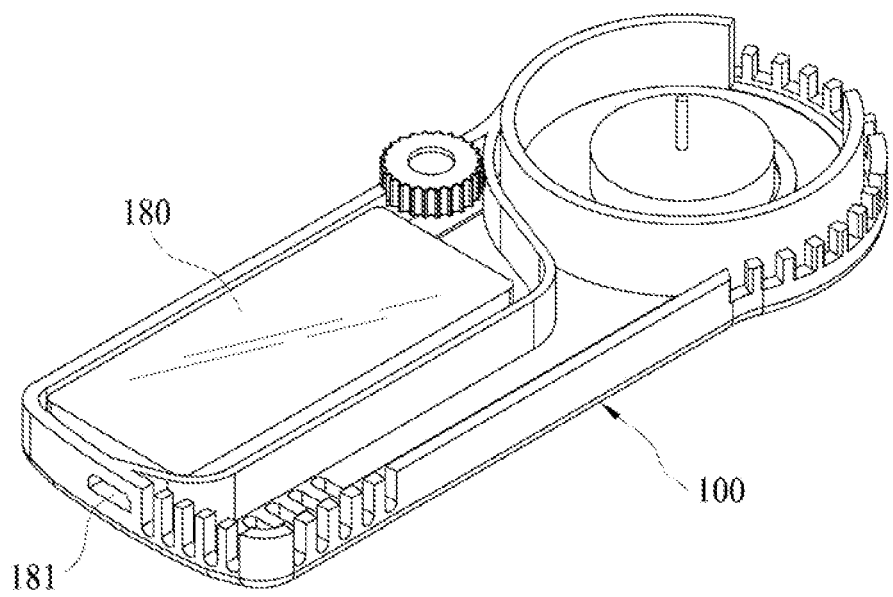

[FIG. 20]
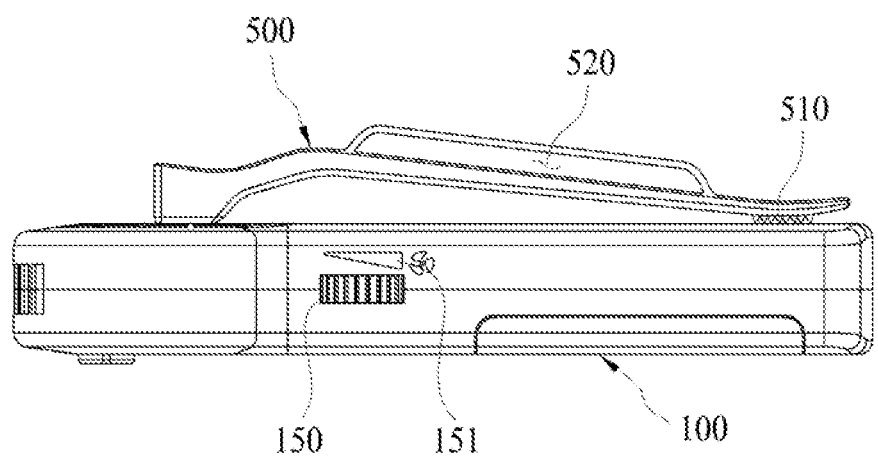

[FIG. 21]
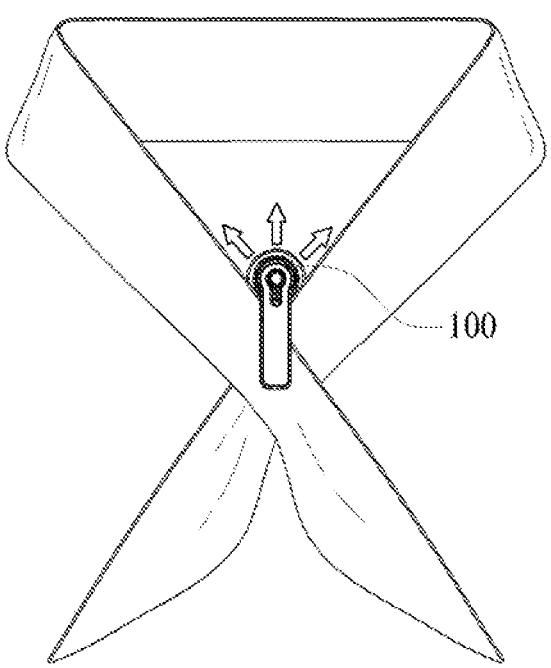

[FIG. 22]
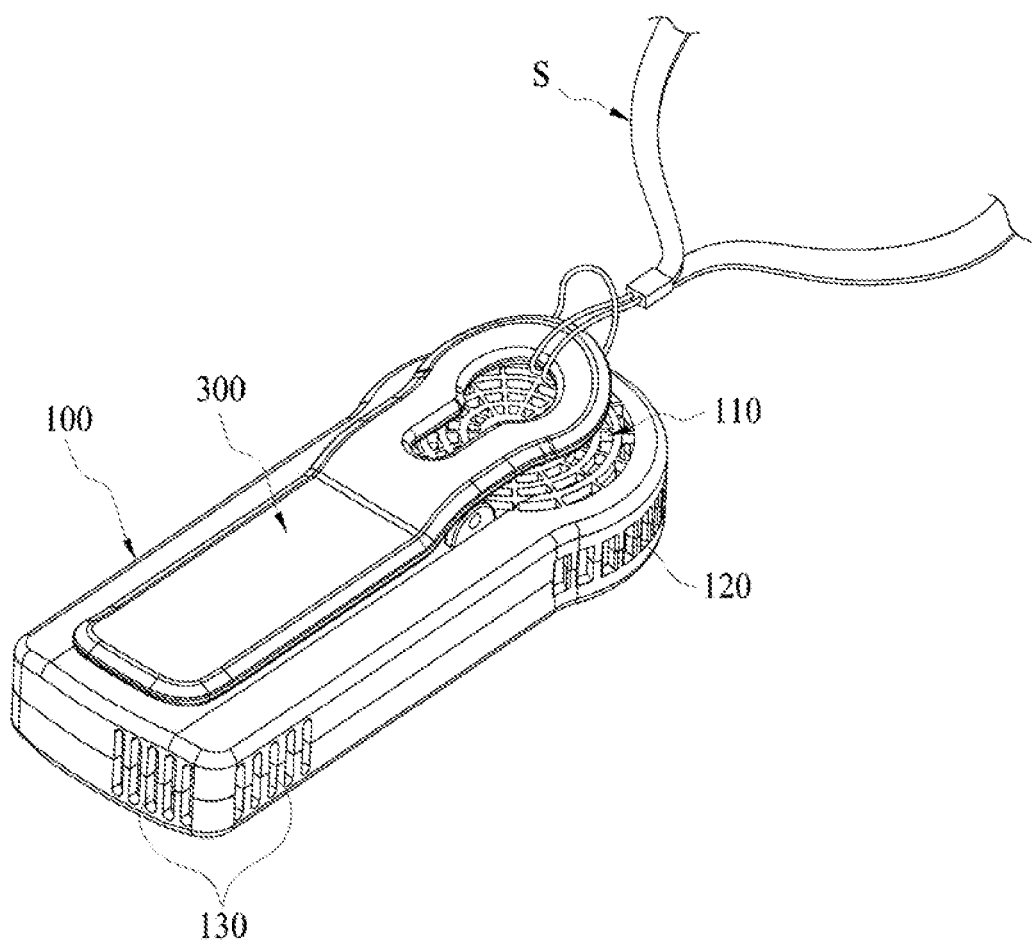

[FIG. 23]
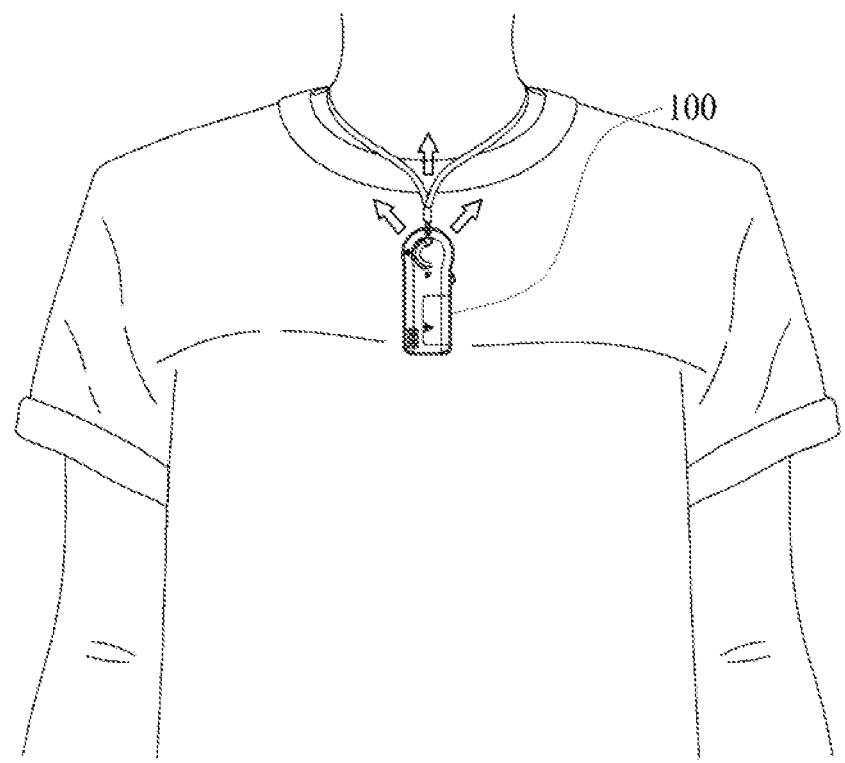

CLIP FAN

CROSS REFERENCE TO PRIOR APPLICATIONS

This application is a National Stage Application of PCT International Patent Application No. PCT/KR2016/002311 filed on Mar. 9, 2016, under 35 U.S.C. § 371, which is hereby incorporated by reference in its entirety.

TECHNICAL FIELD

The present invention relates to a clip fan, and more particularly, to a clip fan which may be conveniently carried, may be used by being fixed to a user's clothes by means of a clip, and may allow the user to selectively control a wind direction as necessary so as to effectively blow air even into the inside of the user's clothes.

BACKGROUND ART

In general, a portable fan refers to a small-sized fan provided to allow a user to use the portable fan while conveniently carrying and holding the portable fan.

Because intensity of wind is inevitably restricted due to a structural limitation of the small-sized portable fan, the user generates wind by holding the portable fan with his/her hand and positioning the portable fan close to the user's body in order to effectively use the portable fan.

In the case of the portable fan in the related art, the user needs to hold the portable fan to use the portable fan as described above, and as a result, there is a drawback in that both hands cannot be free while using the portable fan.

Meanwhile, in order to solve the drawback, a method of attaching the portable fan to the user's clothes and using the portable fan has been proposed, but in the case of the portable fan in the related art, because a position of an air outlet, through which air is blown, is fixed, there is a problem in that a direction of the air outlet needs to be always considered when fixing the portable fan to the user's clothes.

In addition, the portable fan in the related art may blow air only toward the outside of the clothes in a state in which the portable fan is attached to the clothes, and as a result, there is a practical limitation in effectively removing heat.

Therefore, there is a need for development of a new type of portable fan capable of solving the problems with the portable fan in the related art.

DISCLOSURE

Technical Problem

A technical problem to be solved by the present invention is to provide a clip fan which may be conveniently carried, may be used by being fixed to a user's clothes by means of a clip, and may allow the user to selectively control a wind direction as necessary so as to effectively blow air even into the inside of the user's clothes.

The technical problem to be solved by the present invention is not limited to the aforementioned technical problem, and other technical problems, which are not mentioned above, may be clearly understood from the following descriptions by those skilled in the art to which the present invention pertains.

Technical Solution

To solve the technical problem, a clip fan according to the present invention may include: a housing which has an air inlet provided to allow outside air to be introduced into the housing, and an air outlet provided to allow the air introduced through the air inlet to be discharged to the outside; a fan unit which includes a motor and a fan, is embedded in the housing, draws outside air through the air inlet, and discharges the air to the outside through the air outlet; and a clip which is coupled to an outer surface of the housing, and configured to be opened or closed by elastic force.

Further, a flow path may be provided in the housing so that the air introduced through the air inlet flows along the flow path, and the air outlet may include a main air outlet which is formed at one side of the housing, and a sub air outlet which is formed at the other side of the housing and provided such that the air, which flows by the fan unit along the flow path to the other side of the housing, is discharged to the outside.

In addition, the clip fan may further include a direction guide which is provided in the housing and controls a flow direction of the air introduced by the fan unit so that the air introduced by the fan unit may be discharged to the outside through any one of the main air outlet and the sub air outlet.

In this case, the direction guide may be coupled to accommodate therein the fan unit, and may include a guide wall which is formed at a circumference of a side portion of the direction guide so as to surround the fan unit and block a flow of air discharged by the fan unit, and a vent hole which is formed by opening only a part of the guide wall and allows the air discharged by the fan unit to pass through the vent hole.

Further, the direction guide may rotate to change a direction of the vent hole so that the vent hole is directed toward the main air outlet or the sub air outlet, the sub air outlet may be closed by the guide wall when the vent hole is positioned to be directed toward the main air outlet, and the main air outlet may be closed by the guide wall when the vent hole is positioned to be directed toward the sub air outlet.

Meanwhile, the main air outlet may include a first air outlet and a second air outlet which are formed at one side of the housing in different directions, the direction guide may rotate to selectively change a direction of the vent hole so that the vent hole is directed toward any one of the first air outlet and the second air outlet when the vent hole is positioned to be directed toward the main air outlet, the second air outlet may be closed by the guide wall when the vent hole is positioned to be directed toward the first air outlet, and the first air outlet may be closed by the guide wall when the vent hole is positioned to be directed toward the second air outlet.

Further, the sub air outlet may include a third air outlet, a fourth air outlet, and a fifth air outlet which are formed at the other side of the housing in different directions.

In addition, the direction guide may further include a shifter which is exposed to the outside of the housing through a guide slit formed in the housing so as to rotate the direction guide from the outside of the housing.

Further, the housing may further include a control switch which determines whether to operate the motor, controls a rotational speed of the motor, and adjusts a velocity of air discharged through the air outlet.

Meanwhile, the fan may be configured as a centrifugal fan which draws outside air and blows the air by using centrifugal force, and the fan may be a forward-curved multi-blade fan of which the front ends of the blades, where the air flows forward, are curved.

Moreover, the clip may include a pushing portion which is positioned at one side of the clip based on a coupling portion coupled to the outer surface of the housing, and provided to allow a user to push the pushing portion, and a fixing portion which is positioned at the other side of the clip extending from the pushing portion, and provided to be spaced apart from the outer surface of the housing when the pushing portion is pushed so that a fixing object is inserted between the fixing portion and the outer surface of the housing, and to be closed by elastic force so as to fix the fixing object.

Here, the pushing portion may be positioned to be spaced apart from the air inlet and to face the air inlet, and may include a through hole which is provided such that the air introduced into the air inlet passes through the through hole.

Further, the fixing portion may include a non-slip pad which is provided at a side facing the outer surface of the housing, and a concave-convex portion having a plurality of protrusions may be formed on the outer surface of the housing which faces the non-slip pad.

Furthermore, the clip may be made of a material having elasticity and elastic restoring force, one side of the clip may be fixed to the outer surface of the housing, a plurality of serrated portions may be formed at the other side of the clip which comes into direct contact with the outer surface of the housing such that the clip is opened by external force, and a fastening ring, into which the fixing object is fitted, may be provided at a side which extends from one side to the other side.

Advantageous Effects

The clip fan according to the present invention, which is configured as described above, has the following effects.

First, the clip fan according to the present invention may be conveniently carried, and may be used by being fixed to the user's clothes by means of the clip.

In addition, the user may selectively control a wind direction as necessary, and thus air may be efficiently blown even into the inside of the user's clothes.

The effects of the present invention are not limited to the aforementioned effects, and other effects, which are not mentioned above, will be clearly understood by those skilled in the art from the disclosure of the claims.

DESCRIPTION OF DRAWINGS

FIGS. 1 to 2 are views illustrating an external shape of a clip fan according to an exemplary embodiment of the present invention.

FIGS. 3 and 4 are views illustrating constituent elements of the clip fan according to the exemplary embodiment of the present invention.

FIG. 5 is a view illustrating a shifter according to the exemplary embodiment of the present invention.

FIGS. 6 to 8 are views illustrating an operation of controlling an air flow direction by manipulating a direction guide by using the shifter.

FIGS. 9 to 13 are views illustrating the clip fan which is used by being attached to the user's clothes in accordance with the exemplary embodiment of the present invention.

FIG. 14 is a view illustrating the shifter which may be configured in another form in accordance with the exemplary embodiment of the present invention.

FIGS. 15 and 16 are views illustrating a clip according to the exemplary embodiment of the present invention.

FIGS. 17 and 18 are views illustrating a control switch according to the exemplary embodiment of the present invention.

FIG. 19 is a view illustrating a battery unit according to the exemplary embodiment of the present invention.

FIG. 20 is a view illustrating the clip fan which is used by being attached to a scarf, a muffler, a towel, and the like in accordance with the exemplary embodiment of the present invention.

FIG. 21 is a view illustrating the clip which may be configured in another form in accordance with the exemplary embodiment of the present invention.

FIGS. 22 and 23 are views illustrating the clip fan which may be used as a necklace-like fan by using an accessory such as a strap in accordance with the exemplary embodiment of the present invention.

DESCRIPTION OF MAIN REFERENCE NUMERALS OF DRAWINGS

100: housing
200: fan unit
110: air inlet
210: fan
120: main air outlet
220: motor
121: first air outlet
300, 500: clip
122: second air outlet
400: direction guide
130: sub air outlet
410: guide wall
131: third air outlet
420: vent hole
132: fourth air outlet
430: shifter
133: fifth air outlet
140: flow path
150: control switch

BEST MODE

Hereinafter, an exemplary embodiment of the present invention for specifically accomplishing the objects of the present invention will be described with reference to the accompanying drawings. In the description of the present exemplary embodiment, like terms and like reference numerals are used for like configurations, and additional descriptions for the like configurations will be omitted.

In addition, in the description of the present exemplary embodiment, the configurations illustrated in the drawings merely suggest examples for helping understand the detailed description, but are not intended to limit the scope of the present invention.

First, a configuration of a clip fan according to an exemplary embodiment of the present invention will be described with reference to FIGS. 1 to 4.

As illustrated in FIGS. 1 to 4, the clip fan according to the present exemplary embodiment may include a housing 100, a fan unit 200, a clip 300, and a direction guide 400.

Here, the housing 100 is a body that constitutes the clip fan, that is, a kind of case provided to allow various types of configurations to be embedded therein or coupled to thereto.

The housing 100 may have an air inlet 110 which is provided to allow outside air to be introduced into the housing 100, and air outlets 120 and 130 which are provided to allow the air introduced through the air inlet 110 to be discharged to the outside.

In this case, in the housing 100, a flow path 140 may be provided so that the air introduced into the housing 100 through the air inlet 110 may flow along the flow path 140.

Further, the air outlets 120 and 130 may include main air outlets 120 which are formed at one side of the housing 100, and sub air outlets 130 which are formed at the other side of the housing 100 and provided so that the air flowing along the flow path 140 to the other side of the housing 100 may be discharged to the outside.

The fan unit 200 includes a fan 210 and a motor 220, and the fan unit 200 is embedded in the housing 100 so as to be able to draw outside air through the air inlet 110 and discharge the air to the outside through the outlets 120 and 130.

Here, the motor 220 is coupled with the fan 210, and may rotate the fan 210 by being supplied with electric power from a battery B embedded in the housing 100.

Further, as illustrated in the attached drawings, the fan 210 according to the present exemplary embodiment may be configured as a centrifugal fan that draws outside air and blows the air by using centrifugal force.

Further, the fan 210 may be configured as a forward-curved multi-blade fan of which the front ends of the blades, where the air flows forward, are curved.

The clip 300 is coupled to an outer surface of the housing 100, and may be configured to be opened and closed by elastic force.

By using the clip 300, a user may fix the housing 100 to a fixing object by opening the clip 300, inserting the fixing object between the clip 300 and the outer surface of the housing 100, closing the clip 300, and elastically pressing the fixing object.

In this case, the fixing object refers to an object to which the user intends to fix the clip fan, and for example, the fixing object may refer to a neck portion, a front opening portion, a front pocket portion, and the like of the clothes which the user wears.

In particular, in a case in which the clip fan is fixed to the front opening portion of the clothes, the clip fan may be fixed so that the air outlets 120 and 130 of the housing 100 are positioned in a gap between buttons of a shirt such as a dress shirt and a summer shirt.

As such, the user may fix the clip fan according to the present exemplary embodiment to a desired position of the clothes by using the clip 300 as described above.

Further, in order to efficiently blow air toward the user based on a position of the housing 100 which varies depending on the fixing object and a fixing position, a wind direction may be selectively controlled as necessary, and it is possible to efficiently blow air even into the inside of the user's clothes.

To perform the aforementioned function, the clip fan according to the present exemplary embodiment may further include the direction guide 400 which controls a flow direction of the air introduced by the fan unit 200.

The direction guide 400 is provided in the housing 100, and may selectively control a flow direction of the air so that the air introduced by the fan unit 200 may be discharged to the outside through any one of the main air outlets 120 and the sub air outlets 130.

To this end, the direction guide 400 may be coupled to accommodate therein the fan unit 200, and a guide wall 410, which surrounds the fan unit 200 and blocks a flow of air discharged by the fan unit 200, may be formed at a circumference of a side portion of the direction guide 400.

In this case, a vent hole 420, which is formed by opening only a part of the guide wall 410, may be formed in the guide wall 410 so that the air discharged by the fan unit 200 may pass through the vent hole 420.

Therefore, the air, which is introduced into the housing 100 by the fan unit 200, may be discharged in a direction in which the vent hole 420 is positioned, and therefore, the direction guide 400 may control a blowing direction of the air discharged by the fan unit 200.

More specifically, a configuration and a function of the direction guide 400 according to the present exemplary embodiment will be described below with reference to FIGS. 5 to 8.

The direction guide 400 may further include a shifter 430 which is exposed to the outside of the housing through a guide slit 160 formed in the housing 100 so that the user may rotate the direction guide 400 from the outside of the housing 100.

The user may rotate the direction guide 400 by using the shifter 430, and the direction guide 400 may rotate to change a direction of the vent hole 420 so that the vent hole 420 is directed toward the main air outlets 120 or the sub air outlets 130.

Meanwhile, when the direction guide 400 is rotated such that the vent hole 420 is positioned to be directed toward the main air outlets 120, the sub air outlets 130 may be closed by the guide wall 410.

In contrast, when the direction guide 400 is rotated such that the vent hole 420 is directed toward the sub air outlets 120, the main air outlets 120 may be closed by the guide wall 410.

Therefore, the direction guide 400 may selectively control a flow direction of the air so that the air discharged by the fan unit 200 may be blown to the outside only through any one of the main air outlets 120 and the sub air outlets 130.

In addition, as illustrated in the attached drawings, the main air outlets 120 according to the present exemplary embodiment may include a first air outlet 121 and a second air outlet 122 which are formed at one side of the housing 100 in different directions.

Likewise, the sub air outlets 130 according to the present exemplary embodiment may also include a third air outlet 131, a fourth air outlet 132, and a fifth air outlet 133 which are formed at the other side of the housing 100 in different directions.

Further, when the vent hole 420 is positioned to be directed toward the main air outlets 120, the direction guide 400 may rotate to selectively change a direction of the vent hole 420 so that the vent hole 420 is directed toward any one of the first air outlet 121 and the second air outlet 122.

More specifically, as illustrated in FIG. 5, the direction guide 400 may position the vent hole 420 roughly in three directions at positions A, B, and C by using the shifter 430 that may be moved along the guide slit 160 formed in the housing 100.

Here, the position A may indicate a direction in which the first air outlet 121 is formed, the position B may indicate a direction in which the second air outlet 122 is formed, and the position C may indicate a direction in which the flow path 140, which is connected with the sub air outlets 130 including the third air outlet 131, the fourth air outlet 132, and the fifth air outlet 133, is formed.

That is, as illustrated in FIG. 6, when the vent hole 420 is positioned at the position A directed toward the first air outlet 121, the air discharged by the fan unit 200 may be blown to the outside only through the first air outlet 121.

In this case, the flow path 140, which is connected with the second air outlet 122 and the sub air outlets 130 including the third air outlet 131, the fourth air outlet 132, and the fifth air outlet 133, except for the first air outlet 121, may be closed by the guide wall 410.

In contrast, as illustrated in FIG. 7, when the vent hole 420 is positioned at the position B directed toward the second air outlet 122, the air discharged by the fan unit 200 may be blown to the outside only through the second air outlet 122.

In this case, the flow path 140, which is connected with the first air outlet and the sub air outlets 130 including the third air outlet 131, the fourth air outlet 132, and the fifth air outlet 133, except for the second air outlet 122, may be closed by the guide wall 410.

Further, as illustrated in FIG. 8, when the vent hole 420 is positioned at the position C directed toward the flow path 140, the air discharged by the fan unit 200 may be blown to the outside only through the sub air outlets 130 including the third air outlet 131, the fourth air outlet 132, and the fifth air outlet 133.

Here, since the third air outlet 131, the fourth air outlet 132, and the fifth air outlet 133 are formed in different directions, the air discharged by the fan unit 200 may be blown to the outside simultaneously at various angles.

In this case, the first air outlet 121 and the second air outlet 122, except for the flow path 140, may be closed by the guide wall 410.

Meanwhile, in the description of the main air outlets 120 according to the present exemplary embodiment with reference to the drawings, the configuration in which the main air outlets 120 include the first air outlet 121 and the second air outlet 122 is just an example for helping understand the present exemplary embodiment.

That is, it is noted that in the clip fan according to the present invention, the number of main air outlets 120 is not limited only to two, and more main air outlets 120 may be provided as necessary when designing the clip fan.

The same applies to the sub air outlets 130, and the sub air outlets 130 are also not limited as including the third air outlet 131, the fourth air outlet 132, and the fifth air outlet 133, and more sub air outlets 130 may be provided as necessary when designing the clip fan.

To return, the clip fan according to the present exemplary embodiment may be used by being freely attached to the user's clothes with the aforementioned configuration, and may be applied to the user's various clothes such as a T-shirt or a shirt by using the clip 300.

Further, as illustrated in FIGS. 9 and 10, the housing 100 may be fixed to a desired position, and a blowing direction of the air may be efficiently controlled based on a position of the housing 100 which varies depending on the fixing object and the fixing position.

In this case, the user may rotate the direction guide 420 by manipulating the shifter 430 so that a flow of air discharged by the fan unit 200 is directed toward one of the first air outlet 121 and the second air outlet 122.

Further, as illustrated in FIGS. 11 to 13, the clip fan according to the present exemplary embodiment may be fixed by using the clip 300 such that the other side of the housing 100 having the sub air outlets 130 is positioned inside clothes S through the front opening portion of the user's clothes S.

When the sub air outlets 130 are positioned inside the clothes as described above, the user may rotate the direction guide 420 by manipulating the shifter 430 so that the air discharged by the fan unit 200 flows along the flow path 140 toward the sub air outlets 130.

In this case, because one side of the housing where the air inlet 110 is formed is positioned outside the clothes S, outside air may be sufficiently introduced.

Further, since the sub air outlets 130 include the plurality of air outlets such as the third air outlet 131, the fourth air outlet 132, and the fifth air outlet 133, the air may be effectively blown in a three-dimensional manner even into the inside of the user's clothes.

Further, although not illustrated in the drawings, in the clip fan according to the present exemplary embodiment, a separate fixing device or the like, which may prevent the housing 100 from excessively coming into contact with the user's body, may be provided on the clip 300 or at the other side of the housing 100 which positioned inside the user's clothes, thereby preventing the user's body from coming into direct contact with the housing 100 to cause discomfort.

Meanwhile, as illustrated in FIG. 14, a guide slit 160a and a shifter 430a according to the present exemplary embodiment may be formed along an outer circumference at one side of the housing 100 where the first air outlet 121 and the second air outlet 122 are formed.

As described above, when the clip fan is fixed such that the sub air outlets 130 are positioned inside the clothes S through the front opening portion of the user's clothes S, the shifter 430 is generally positioned to be directed toward the user's body in consideration of the position of the air inlet 110.

For this reason, the user may be inconvenienced when manipulating the shifter 430, but in a case in which the guide slit 160a and the shifter 430a are formed as illustrated in the attached FIG. 14, accessibility to the shifter 430a is improved, and as a result, the user may more easily and conveniently manipulate the shifter 430a.

In addition, as illustrated in FIGS. 15 and 16, the clip 300 according to the present exemplary embodiment may include a pushing portion 320 and a fixing portion 330.

More specifically, the clip 300 according to the present exemplary embodiment may include the pushing portion 320 which is positioned at one side of the clip 300 based on a coupling point 310 coupled to the outer surface of the housing 100, and the pushing portion 320 is provided to allow the user to push the pushing portion 320.

Further, the clip 300 may include the fixing portion 330 which is positioned at the other side of the clip 300 extending from the pushing portion 320, and the fixing portion 330 is provided to be spaced apart from the outer surface of the housing 100 when the pushing portion 320 is pushed so that the fixing object may be inserted between the fixing portion 330 and the outer surface of the housing 100.

The fixing portion 330 is closed by elastic force so as to clamp and fix the fixing object.

As described above, the fixing object refers to an object to which the user intends to fix the clip fan, and for example, the fixing object may refer to a neck portion, a gap between buttons of a front opening portion, a front pocket portion, and the like of the clothes which the user wears.

Meanwhile, as illustrated in the attached drawings, the pushing portion 320 is positioned to be spaced apart from the air inlet 110 and to face the air inlet 110, and may include a through hole 321 which is provided such that the air introduced through the air inlet 110 may pass through the through hole 321.

Therefore, even though the pushing portion 320 is positioned to face the air inlet 110, a flow of outside air introduced through the air inlet 110 is not hindered by the clip 300, and the outside air may be sufficiently introduced into the air inlet 110 through the through hole 321.

Further, the fixing portion 330 includes a non-slip pad 331 provided at a side facing the outer surface of the housing 100, and a concave-convex portion 170 having a plurality of protrusions may be formed on the outer surface of the housing 100 facing the non-slip pad 331.

Here, when the housing 100 is fixed to the fixing object by using the clip 300, the non-slip pad 331 may prevent the housing 100 from slipping from an initial fixing position by a weight of the housing 100, and the non-slip pad 331 may be made of a material such as rubber, silicone, and silicone rubber.

Likewise, when the housing 100 is fixed to the fixing object by using the clip 300, the concave-convex portion 170 may also assist in securely fixing the housing 100 at the initial fixing position by a weight of the housing 100, and may be positioned to be in direct contact with the non-slip pad 331, thereby more improving the effect of securely fixing the housing 100.

Further, as illustrated in FIGS. 17 and 18, the housing 100 according to the present exemplary embodiment may further include a control switch 150 which determines whether to operate the motor 220 of the fan unit 200 and controls a rotational speed of the motor 220.

The control switch 150 is configured in the form of a dial and provided at a lateral side of the housing 100, and the control switch 150 may be rotated to adjust a velocity of air discharged through the air outlets 120 and 130.

In this case, an indication mark 151, which visually indicates a rotation direction of the control switch 150 in accordance with a magnitude of a velocity of air, may be formed at the lateral side of the housing where the control switch 150 is provided.

In addition, as illustrated in FIG. 18, a control switch 150a according to the present exemplary embodiment may be configured in the form of an electronic button instead of the mechanical dial.

In this case, a display 151a, which displays a current velocity of air in a stepwise manner, may be provided at the lateral side of the housing where the control switch 150a is provided.

Meanwhile, in addition to the foregoing configurations of the control switch 150, the control switch 150 according to the present exemplary embodiment may be variously configured as much as needed as a configuration and a structure that may control whether to operate the motor and control a rotational speed of the motor.

As described above, the control switch 150 may be operated directly by the user to control whether to operate the motor 220 and control a rotational speed of the motor, but the control switch 150 may be configured to control whether to operate the motor 220 and control a rotational speed of the motor 220 by using a near field communication such as Bluetooth.

Further, although not illustrated in the drawings, the control switch 150 may be configured to control whether to operate the motor 220 and control a rotational speed of the motor 220 by using a one-chip microprocessor (collectively referred to as a micom).

Further, as illustrated in FIG. 19, a battery unit 180 may be provided in the housing 100 according to the present exemplary embodiment so as to supply electric power required to operate the motor 220.

The battery unit 180 may be configured to be charged through a universal serial bus (USB), and a port 181, to which a pin cable and the like for charging the battery unit 180 may be connected, may be provided in the housing 100.

Therefore, the clip fan according to the present exemplary embodiment may reduce maintenance costs which may be increased when a primary battery such as a dry battery is used, and the clip fan may be easily charged anywhere and continuously used.

Further, as illustrated in FIG. 20, the clip fan according to the present exemplary embodiment may be used by being attached to a scarf, a muffler, a towel, and the like as well as the user's clothes.

To this end, a clip 500 according to the present exemplary embodiment may have a shape illustrated in FIG. 21 and may be made of a material having elasticity and elastic restoring force in order to more securely attach the housing 100 to the scarf, the muffler, the towel, and the like.

As illustrated in FIG. 21, one side of the clip 500 is fixed to the outer surface of the housing 100, a plurality of serrated portions 510 is formed at the other side of the clip 500 which comes into direct contact with the outer surface of the housing 100, and the clip 500 is configured to be opened by external force.

In addition, a fastening ring 520, into which the fixing object may be fitted, may be provided at a side which extends from one side to the other side.

In this case, the fixing object, which is fitted into the fastening ring 520, may be an accessory such as a scarf, a muffler, and a towel which may be worn around the user's neck.

With the clip 500 which is configured as described above, the clip fan according to the present exemplary embodiment may be used by being securely fixed even to an accessory such as a scarf, a muffler, and a towel which may be worn around the user's neck.

In addition, in a case in which the clip fan is used in a state in which the scarf, the muffler, or the towel is wet with water, vaporization of water may be facilitated by air blown through the air outlets 120 and 130, and as a result, the user may more effectively remove heat.

Further, as illustrated in FIGS. 22 and 23, the clip fan according to the present exemplary embodiment may also be used as a necklace-like fan by being attached to an accessory such as a strap S configured to be worn around the user's neck.

Therefore, the user may wear the clip fan around his/her neck like a necklace-like fan in the related art, and then hold the clip fan and blow air directly toward a desired portion to be exposed to the wind as necessary.

The exemplary embodiments according to the present invention have been described above, and it is obvious to those skilled in the art that the present invention may be specified in other particular forms in addition to the aforementioned exemplary embodiments without departing from the spirit or the scope of the present invention.

Accordingly, it should be understood that the aforementioned exemplary embodiments are illustrative and not restrictive, and thus the present invention is not limited to the aforementioned description, and may be modified within the scope and the equivalent range of the appended claims.

The invention claimed is:

1. A clip fan comprising:
    a housing which has an air inlet provided to allow outside air to be introduced into the housing, and an air outlet provided to allow the air introduced through the air inlet to be discharged to the outside;
    a fan unit which includes a motor and a fan, is embedded in the housing, draws outside air through the air inlet, and discharges the air to the outside through the air outlet; and
    a clip which is coupled to an outer surface of the housing, and configured to be opened or closed by elastic force;

a flow path having a longitudinal shape and provided in the housing so that the air introduced through the air inlet flows along the flow path, wherein the air outlet includes:
- a main air outlet which is formed at one side of the housing and connected to one end of the flow path:
- a sub air outlet which is formed at an other side of the housing and connected to the other end of the flow path, the sub air outlet provided such that the air, which flows by the fan unit along the flow path to the other side of the housing, is discharged to the outside: and
- a direction guide which is provided in the housing and controls a flow direction of the air introduced by the fan unit so that the air introduced by the fan unit is discharged to the outside through any one of the main air outlet and the sub air outlet, wherein the direction guide is coupled to accommodate therein the fan unit the direction guide including:
- a guide wall which is formed at a circumference of a side portion of the direction guide so as to surround the fan unit and block a flow of air discharged by the fan unit, and
- a vent hole which is formed by opening only a part of the guide wall and allows the air discharged by the fan unit to pass through the vent hole;

wherein the direction guide is configured to rotate to change a direction of the vent hole so that the vent hole is directed toward the main air outlet or the sub air outlet;

wherein the sub air outlet is closed by the guide wall upon the vent hole being positioned to be directed toward the main air outlet and the main air outlet is closed by the guide wall upon the vent hole being positioned to be directed toward the sub air outlet.

2. The clip fan of claim 1, wherein the main air outlet includes a first air outlet and a second air outlet which are formed at the one side of the housing in different directions, the direction guide rotates to selectively change a direction of the vent hole so that the vent hole is directed toward any one of the first air outlet and the second air outlet when the vent hole is positioned to be directed toward the main air outlet, the second air outlet is closed by the guide wall when the vent hole is positioned to be directed toward the first air outlet, and the first air outlet is closed by the guide wall when the vent hole is positioned to be directed toward the second air outlet.

3. The clip fan of claim 2, wherein the direction guide further includes a shifter which is exposed to the outside of the housing through a guide slit formed in the housing so as to rotate the direction guide from the outside of the housing.

4. The clip fan of claim 1, wherein the sub air outlet includes a third air outlet, a fourth air outlet, and a fifth air outlet which are formed at the other side of the housing in different directions.

5. The clip fan of claim 1, wherein the housing further includes a control switch which determines whether to operate the motor, controls a rotational speed of the motor, and adjusts a velocity of air discharged through the air outlet.

6. The clip fan of claim 1, wherein the fan is configured as a centrifugal fan which draws outside air and blows the air by using centrifugal force, and the fan is a forward-curved multi-blade fan of which the front ends of the blades, where the air flows forward, are curved.

7. The clip fan of claim 1, wherein the clip includes a pushing portion which is positioned at one side of the clip based on a coupling portion coupled to the outer surface of the housing, and provided to allow a user to push the pushing portion, and a fixing portion which is positioned at an other side of the clip extending from the pushing portion, and provided to be spaced apart from the outer surface of the housing when the pushing portion is pushed so that a fixing object is inserted between the fixing portion and the outer surface of the housing, and to be closed by elastic force so as to fix the fixing object.

8. The clip fan of claim 7, wherein the pushing portion is positioned to be spaced apart from the air inlet and to face the air inlet, and includes a through hole which is provided such that the air introduced into the air inlet passes through the through hole.

9. The clip fan of claim 7, wherein the fixing portion includes a non-slip pad which is provided at a side facing the outer surface of the housing, and a concave-convex portion having a plurality of protrusions is formed on the outer surface of the housing facing the non-slip pad.

10. The clip fan of claim 1, wherein the clip is made of a material having elasticity and elastic restoring force, one side of the clip is fixed to the outer surface of the housing, a plurality of serrated portions is formed at an other side of the clip which comes into direct contact with the outer surface of the housing such that the clip is opened by external force, and a fastening ring, into which a fixing object is fitted, is provided which extends from one side to the other side.

* * * * *